United States Patent [19]

Ishikura et al.

[11] Patent Number: 5,298,531
[45] Date of Patent: Mar. 29, 1994

[54] PROCESS FOR THE PREPARATION OF POLYIMIDE FOAM

[75] Inventors: Motoshi Ishikura; Nobuyuki Watanabe, both of Hiroshima, Japan

[73] Assignee: Daicel Chemical Industries, Ltd., Osaka, Japan

[21] Appl. No.: 25,896

[22] Filed: Mar. 3, 1993

Related U.S. Application Data

[63] Continuation of Ser. No. 689,277, filed as PCT/JP91/00046, Jan. 18, 1991.

[30] Foreign Application Priority Data

Jan. 19, 1990 [JP] Japan .................................. 2-10118

[51] Int. Cl.$^5$ ............................................. C08J 9/02

[52] U.S. Cl. ................................... 521/184; 521/155; 521/185; 521/189; 528/347; 528/348

[58] Field of Search ................... 521/184, 185, 155; 528/347, 348

[56] References Cited

U.S. PATENT DOCUMENTS 4,980,389 12/1990 Hill et al. ........................... 521/185

*Primary Examiner*—Morton Foelak
*Attorney, Agent, or Firm*—Flynn, Thiel, Boutell & Tanis

[57] ABSTRACT

A polyimide foam is prepared by heating a mixture comprising an alkyl ester of 4,4'-oxydiphthalic acid and a diamine at a temperature of 60° to 350° C. This foam is elastic and flame-retardant and has an excellent resistance to acid and alkali.

4 Claims, No Drawings

PROCESS FOR THE PREPARATION OF POLYIMIDE FOAM an alkyl ester of 4,4'-oxydiphthalic acid and a diamine as the main components. Preferably, the polyimide has a structure represented by the following formula:

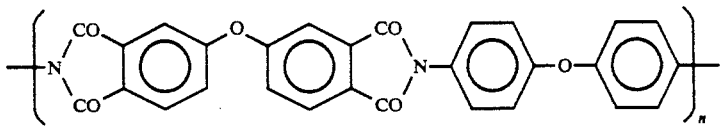

This application is a continuation of U.S. Ser. No. 07/689 277, filed as PCT/JP91/00046, Jan. 18, 1991 filed now abandoned.

FIELD OF INDUSTRIAL APPLICATION

The present invention relates to a polyimide foam which is elastic and flame-retardant and has an excellent resistance to acids and alkalis, and a process for the preparation of the same.

PRIOR ART

Although various polyimides having a 4,4'-oxydiphthaloyl skeleton have already been synthesized and known as polymers having an excellent resistance to acids and alkalis, no studies have been made on any foam having such a skeleton as of yet.

Several flame-deterrent polyimide compositions useful for giving foams are disclosed in U.S. Pat. Nos. 3,554,939 and 4,296,208.

These polyimide foams are prepared from a benzophenonetetracarboxylic ester and a m-substituted aromatic diamine or an aromatic diamine containing a small amount of an aliphatic diamine and are described as being flexible, elastic and flame-retardant.

Although the polyimide foam prepared from the above raw materials has excellent characteristics as described above, it also has a problem of being poor in resistance to acids and alkalis because of the use of benzophenonetetracarboxylic acid as a raw material. Further, the foam has another problem that the excellent heat resistance inherent in polyimide is impaired to some extent since a m-substituted aromatic diamine or an aromatic diamine containing a small amount of an aliphatic diamine is used for the purpose of imparting flexibility to the foam. Accordingly, the development of a polyimide foam which is improved in elasticity, flame retardance, and acid and alkali resistance without impairing the high heat resistance inherent in polyimides has been eagerly expected. Under these circumstances, the present invention aims at providing a polyimide foam free from the above problems.

DISCLOSURE OF THE INVENTION

The inventors of the present invention have found that the above problems can be completely solved by using a specific compound as a starting material in the above foam preparation technique according to the prior art and have accomplished the present invention. That is, the inventors of the present invention have now found that a polyimide foam having excellent elasticity, flame retardance, and acid and alkali resistance can be prepared by the same technique as that described above except that the benzophenonetetracarboxylic acid used as a raw material is replaced by 4,4'-oxydiphthalic acid, even when the amine component is exclusively composed of a p-substituted aromatic diamine.

The present invention relates to a polyimide foam prepared by heating a polyimide precursor comprising an alkyl ester of 4,4'-oxydiphthalic acid and a diamine as the main components. Preferably, the polyimide has a structure represented by the following formula:

wherein n is 10 to 1,000,000. The density of the polyimide foam is preferably 1 to 800 kg/m$^3$. Further, the present invention relates also to a process for the preparation of a polyamide foam which comprises heating a polyimide precursor comprising an alkyl ester of 4,4'-oxydiphthalic acid and a diamine as the main components at a temperature of 60° to 350° C.

Preferably, the present invention relates to process for the preparation of a polyimide foam which comprises heating a polyimide precursor comprising a lower alkyl alcohol composition containing an alkyl ester of 4,4'-oxydiphthalic acid and a diamine in a sum total of at least 50% by weight at a temperature ranging from 60° to 350° C.

The polyimide precursor according to the present invention can be prepared as follows. First, 4,4'-oxydiphthalic dianhydride is esterified through a reaction with a proper solvent which can act as an esterifying agent (generally a lower alkyl alcohol) and then a diamine is dissolved in the resulting solution. Although the polyimide precursor thus prepared is in the form of a solution, it may be converted into a film or powder by drying the solution to thereby reduce the lower alkyl alcohol content, and such lower alkyl alcohol compositions including films and powders will be referred to as the polyamide precursor in this specification.

The polyimide foam of the present invention can be prepared by heating the polyimide precursor at a suitable temperature ranging from 60° to 350° C. By this heating, the polyimide precursor is condensed and the alcohol and water generated by the condensation and the vapor of the lower alkyl alcohol present in the precursor each act as a blowing agent. As the condensation proceeds, the material gradually becomes cellular and its structure gradually becomes self-supporting to finally give a cured polyimide. When the heating temperature is lower than 60° C., no expansion will be attained, while when it exceeds 350° C., the resulting foam will be poor in characteristics such as heat resistance.

The proper solvent according to the present invention, which acts as an esterifying agent for 4,4'-oxydiphthalic dianhydride, is an alkyl alcohol having at most 7 carbon atoms, and may be substituted with a halogen atom or an amino group. Further, a mixture of two or more of such alcohols may be used. Methyl alcohol is a preferable reactive solvent. In the reaction with such an alcohol, dialkyl 4,4'-oxydiphthalate can be obtained nearly stoichiometrically.

According to the present invention, the diamine to be added to the alcohol solution of an alkyl ester of 4,4'-oxydiphthalic acid is preferably an aromatic diamine from the standpoint of imparting heat resistance to the polyimide foam, though it may be either an aliphatic diamine or an aromatic diamine or a mixture of both. Further, the use of a p-substituted aromatic diamine also gives an excellent polyimide foam. Examples of the diamine which can impart excellent characteristics as described above include 4,4'-oxydianiline, 4,4'-diaminodiphenylmethane, 4,4'-diaminodiphenyl sulfone, 2,2-bis(4-aminophenyl)propane, 4,4'-diaminotriphenyl ether, bis(4-aminophenoxyphenyl)sulfone, 2,2-bis(4-aminophenoxyphenyl)propane and bis(4-aminophenoxy)biphenyl.

According to the present invention, the amount of the diamine to be added to an alcohol solution of an alkyl ester of 4,4'-oxydiphthalic acid is desirably nearly equimolar to that of the ester.

The lower alkyl alcohol content of the polyimide precursor according to the present invention may be arbitrarily selected because the alcohol acts as a blowing agent and when a foam having a lower extent of foaming is desired, such an alcohol may be minutely contained therein. On the other hand, the use of a lower alkyl alcohol in such a large amount as to lower the total content of the alkyl ester of 4,4'-oxydiphthalic acid and the diamine in the precursor to less than 50% by weight has little effect on the extent of foaming and wastefully necessitates a prolonged foaming time.

Various additives may be arbitrarily added to the polyimide precursor for the purpose of improving the various properties of the foam. The additive to be added to the precursor is not particularly limited but may be any one as far as it answers the purpose. Examples thereof include blowing agents, fillers, surfactants and ultraviolet absorbers. Particularly, it is preferable to add a blowing agent in order to obtain a foam having an enhanced extent of foaming, or a surfactant in order to obtain a foam having a uniform cellular structure.

As understood from the foregoing description, a polyimide foam which is elastic and flame retardant and has an excellent resistance to acid and alkali can be prepared by the process of the present invention. This foam can be effectively used for a prolonged period of time in airplane cabins, spacecrafts, land or sea transports and other various fields wherein a conventional combustible and fuming material may be heated so excessively as to put human life or system in danger.

EXAMPLE

The present invention will now be described in more detail by referring to the following Examples. The Examples do not limit the present invention but show preferred embodiments of the present invention. Referential Example (synthesis of polyimide precursor)

1,600 g of methyl alcohol was added to 310.2 g (1 mol) of 4,4'-oxydiphthalic dianhydride and the obtained mixture was heated to 60° C. to continue the reaction until the solution turned transparent. 200.2 g (1 mol) of 4,4'-oxydianiline was added to the resulting solution and the obtained mixture was heated at 60° C. for a while to give a transparent solution. This solution was distilled under a reduced pressure to remove the methyl alcohol, thus giving a polyimide precursor solution (P-1) having a solid content of 80.5% by weight. This precursor solution (P-1) was vacuum dried to give a polyimide precursor powder (P-2) having a solid content of 99.5% by weight.

EXAMPLE 1

100 g of the polyimide precursor solution (P-1) prepared in the above Referential Example was put in a circulating hot air oven and heated at 100° C. for 30 minutes to carry out expansion and followed by thermal treatment at 250° C. for 30 minutes, thus giving a pale-yellow elastic foam. The density thereof was 15 kg/m³. The foam did not burn and generated neither smoke nor toxic gas even when directly exposed to flame. Further, no weight change was observed when the foam was dipped in a 10% NaOH solution or a 37% HCl solution for 24 hours.

EXAMPLE 2

100 g of the polyimide precursor powder (P-2) prepared in the above Referential Example was put in a circulating hot air oven and heated at 150° C. for 30 minutes to carry out expansion and followed by thermal treatment at 250° C. for 30 minutes, thus giving a pale-yellow elastic foam. The density thereof was 65 kg/cm³.

EXAMPLE 3

3 g of NaHCO₃ and 0.1 g of a surfactant L-540, a product of Nippon Unicar Co., Ltd., was added to 100 g of the polyimide precursor solution (P-1) prepared in the above Referential Example, and the obtained mixture was thermally treated in a similar manner to that of Example 1. Thus, a pale-yellow elastic foam having a uniform cellular structure was obtained. Its density was 10 kg/m³.

EXAMPLE 4

100 g of the polyimide precursor solution (P-1) prepared in the above Referential Example was put in a circulating hot air oven and heated at 150° C. for 30 minutes to carry out expansion and followed by thermal treatment at 250° C. for 30 minutes, thus giving a pale-yellow elastic foam. The density thereof was 5 kg/m³.

EXAMPLE 5

100 g of the polyimide precursor solution (P-2) prepared in the above Referential Example was put in a circulating hot air oven and thermally treated at 100° C. for 2 hours and then at 250° C. for 30 minutes to give a pale-yellow elastic foam. Its density was 650 kg/m³.

We claim:

1. A polyimide foam prepared by heating a polyimide precursor comprising an alkyl ester of 4,4'-oxydiphthalic acid and a diamine as the main components.

2. A polyimide foam as set forth in claim 1, wherein said polyimide has a structure represented by the following general formula:

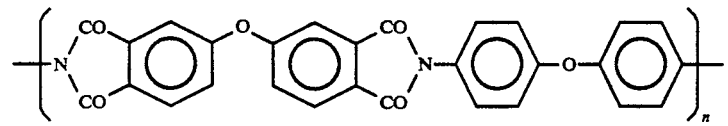

wherein n is 10 to 1,000,000.

3. A polyimide foam as set forth in claim 1, characterized by having a density of 1 to 800 kg/m³.

4. A process for the preparation of a polyimide foam, characterized by heating a polyimide precursor comprising an alkyl ester of 4,4'-oxydiphthalic acid and a diamine as the main components at a temperature of 60° to 350° C.

* * * * *